United States Patent
Trimboli et al.

(10) Patent No.: US 10,337,383 B2
(45) Date of Patent: Jul. 2, 2019

(54) SELECTIVE CATALYST REDUCTION EFFICIENCY DETERMINATION

(71) Applicant: GM GLOBAL TECHNOLOGY OPERATIONS LLC, Detroit, MI (US)

(72) Inventors: Salvatore Trimboli, Turin (IT); Davide Gessaroli, Turin (IT); Valerio Formica, Perugia (IT)

(73) Assignee: GM Global Technology Operations LLC., Detroit, MI (US)

(*) Notice: Subject to any disclaimer, the term of this patent is extended or adjusted under 35 U.S.C. 154(b) by 126 days.

(21) Appl. No.: 15/457,389

(22) Filed: Mar. 13, 2017

(65) Prior Publication Data

US 2018/0258885 A1    Sep. 13, 2018

(51) Int. Cl.
| | |
|---|---|
| *F01N 9/00* | (2006.01) |
| *F02M 26/04* | (2016.01) |
| *F01N 3/20* | (2006.01) |
| *F02B 37/22* | (2006.01) |
| *F02M 26/46* | (2016.01) |

(Continued)

(52) U.S. Cl.
CPC ........... *F01N 9/005* (2013.01); *F01N 3/103* (2013.01); *F01N 3/208* (2013.01); *F01N 3/2066* (2013.01); *F02B 37/22* (2013.01); *F02D 41/0055* (2013.01); *F02D 41/1462* (2013.01); *F02D 41/1465* (2013.01); *F02M 26/04* (2016.02); *F02M 26/06* (2016.02); *F02M 26/46* (2016.02); *F01N 2560/026* (2013.01); *F01N 2560/07* (2013.01); *F01N 2560/14* (2013.01); *F01N 2610/02* (2013.01); *Y02T 10/144* (2013.01); *Y02T 10/24* (2013.01)

(58) Field of Classification Search
CPC .. F02M 2026/003; F02M 26/14; F02M 26/15; F01N 3/103; F01N 3/20; F01N 3/206; F01N 3/2066; F01N 3/208; F01N 9/00; F01N 9/002; F01N 9/005; F01N 2570/14; F01N 11/00
USPC .......................................................... 123/698
See application file for complete search history.

(56) References Cited

U.S. PATENT DOCUMENTS

| | | | |
|---|---|---|---|
| 2004/0244361 A1* | 12/2004 | Tanabe | F01N 3/0842 60/274 |
| 2007/0044456 A1* | 3/2007 | Upadhyay | B01D 53/9409 60/295 |

(Continued)

*Primary Examiner* — Erick R Solis
*Assistant Examiner* — Robert A Werner
(74) *Attorney, Agent, or Firm* — Quinn IP Law

(57) ABSTRACT

A method for an engine employing an after-treatment (AT) system with an AT device for treating an engine exhaust gas includes detecting an actual concentration of a pollutant in the exhaust gas upstream of the AT device. The method additionally includes treating the exhaust gas via the AT device and directing the treated gas to an exhaust gas passage. The method also includes recirculating a portion of the treated exhaust gas from the exhaust gas passage to the engine's intake passage and determining efficiency of the AT device, after recirculating the portion of the treated exhaust gas, using the detected actual pollutant concentration. Furthermore, the method includes maintaining operation of the AT system when the determined AT device efficiency is at or above a predetermined value and activating a sensory signal indicative of the AT device having malfunctioned when the determined AT device efficiency is below the predetermined value.

17 Claims, 3 Drawing Sheets

(51) Int. Cl.
*F01N 3/10* (2006.01)
*F02D 41/14* (2006.01)
*F02D 41/00* (2006.01)
*F02M 26/06* (2016.01)

(56) References Cited

U.S. PATENT DOCUMENTS

| | | | |
|---|---|---|---|
| 2011/0005202 A1* | 1/2011 | Gady | F01N 3/208 60/276 |
| 2011/0041477 A1* | 2/2011 | Mullins | F01N 3/0821 60/274 |
| 2014/0360163 A1* | 12/2014 | Kurtz | F02D 41/0052 60/274 |
| 2015/0226102 A1* | 8/2015 | Hsieh | B01D 53/9418 60/274 |
| 2016/0222850 A1* | 8/2016 | Ota | F01N 3/106 |
| 2016/0290201 A1* | 10/2016 | Haas | F01N 3/021 |
| 2017/0122168 A1* | 5/2017 | Angst | F02M 26/06 |

* cited by examiner

SELECTIVE CATALYST REDUCTION EFFICIENCY DETERMINATION

INTRODUCTION

The present disclosure relates to exhaust gas after-treatment (AT) systems employed in internal combustion engines, such as particulate filters and other devices, to effectively limit exhaust emissions from internal combustion engines. One of the exhaust AT devices frequently used in a modern lean burn internal combustion engine, such as a compression-ignition or diesel type, is a selective catalytic reduction (SCR) catalyst.

The SCR is configured to convert nitrogen oxides ($NO_X$) into diatomic nitrogen ($N_2$) and water ($H_2$) with the aid of the $NO_2$ generated by another exhaust AT device, typically the diesel oxidation catalyst (DOC). For effective removal of $NO_X$, the SCR conversion process additionally requires a predetermined amount of ammonia ($NH_3$) to be present in the exhaust gas flow.

The SCR conversion process may additionally require a controlled or metered amount of a reductant having a general name of "diesel-exhaust-fluid" (DEF) into the exhaust gas flow, when the reductant is employed in diesel engines. Such a reductant may be an aqueous solution of urea that includes water and ammonia.

SUMMARY

A method of operating an internal combustion engine employing an after-treatment (AT) system with an AT device configured to treat an exhaust gas generated by the engine includes supplying an intake airflow to the engine via an intake passage to thereby operate the engine and generate the exhaust gas. The method further includes detecting, via a sensor, an actual first concentration of a pollutant in the exhaust gas upstream of the AT device and communicating a signal indicative of the detected actual first concentration of the pollutant to a controller configured to regulate the AT system. The method also includes treating, via the AT device, the exhaust gas and directing the treated exhaust gas to an exhaust gas passage. The method additionally includes recirculating, via an exhaust gas recirculation (EGR) passage, a portion of the treated exhaust gas from the exhaust gas passage to the intake passage. The method also includes determining via the controller, using the detected actual first concentration of the pollutant, a theoretical efficiency of the AT device after recirculating the portion of the treated exhaust gas. Additionally, the method includes maintaining, via the controller, operation of the AT system when the determined theoretical efficiency of the AT device is at or above a predetermined value. Furthermore, the method includes activating, via the controller, a sensory signal indicative of the AT device having malfunctioned when the determined theoretical efficiency of the AT device is below the predetermined value.

The AT device may be a selective catalytic reduction (SCR) catalyst, while the engine may be a compression-ignition engine.

In such case, the pollutant may be nitrogen oxide ($NO_X$) and the sensor may be a $NO_X$ sensor. Furthermore, the method may further include injecting urea into the exhaust gas upstream of the SCR catalyst and treating the exhaust gas may include the SCR catalyst using the injected urea.

The SCR catalyst may be encased in a common housing with and downstream of a diesel oxidation catalyst (DOC).

The method may also include detecting, via an airflow sensor, an amount of the airflow supplied to the engine when the portion of the treated exhaust gas is recirculated, and communicating to the controller a signal indicative of the detected amount of airflow. The method may additionally include determining, via the controller using a mathematical relationship, a theoretical first $NO_X$ concentration in the exhaust gas after recirculating the portion of the treated exhaust gas, i.e., in the exhaust passage between the engine and the AT device.

The method may further include determining, via the controller, a theoretical second $NO_X$ concentration in the exhaust passage downstream of the AT device using the detected actual first $NO_X$ concentration, the determined theoretical first $NO_X$ concentration, and the detected amount of airflow. In such an embodiment, the act of determining the theoretical efficiency of the AT device may be additionally accomplished via the controller using the determined theoretical second $NO_X$ concentration in the mathematical relationship.

The method may additionally include determining an amount of the exhaust gas contained in the recirculated portion of the treated exhaust gas and using the determined amount of the exhaust gas in the mathematical relationship to determine the theoretical first $NO_X$ concentration The AT system may additionally include an exhaust pressure modulation (EPM) valve configured to regulate the EGR passage, wherein the EPM valve is in electronic communication with the controller. The AT system may further include a variable-geometry turbocharger (VGT) configured to be driven by the exhaust gas and to pressurize the intake airflow. In such an embodiment, the act of recirculating the portion of the treated exhaust gas may include redirecting the treated exhaust gas from the exhaust gas passage to the VGT.

Recirculating the portion of the treated exhaust gas may be accomplished as a low pressure exhaust gas recirculation (LPEGR).

The act of activating the sensory signal may include at least one of activating a malfunction indicator lamp (MIL) and setting an electronic trouble code embedded in the memory of the controller.

The method may additionally include activating, via the controller, a limp-home mode for operating the engine when the determined theoretical efficiency of the AT device is below the predetermined value.

An after-treatment (AT) system for an exhaust gas generated by an internal combustion engine employing a controller configured to perform the above method is also disclosed.

A vehicle employing the above-described AT system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
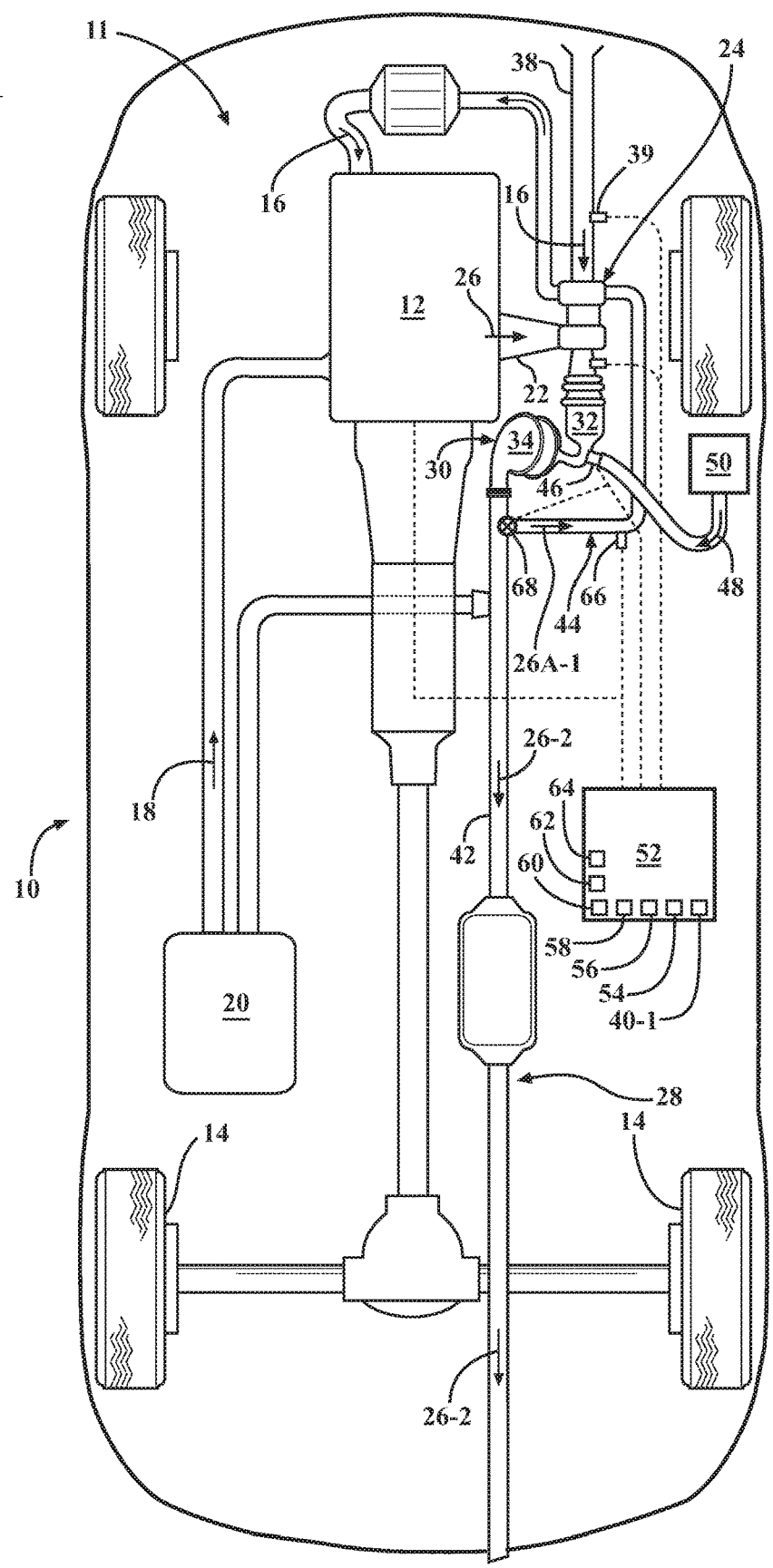
FIG. 1 is a schematic plan view of a vehicle having an internal combustion engine connected to an exhaust system having an after-treatment (AT) system with a number of AT devices for reducing exhaust emissions.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a spark-ignition type, which is, thus, within the scope of the present disclosure, specific reference throughout the ensuing disclosure will be made to a compression-ignition or diesel type of an engine. Internal combustion in a diesel engine embodiment of the engine 12 occurs when a specific amount of ambient intake airflow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized or driven by a flow of exhaust gas, specifically the exhaust gas 26 released by individual cylinders of the engine 12 through the exhaust manifold 22 following each combustion event. The turbocharger 24 is connected to an exhaust system 28 that receives exhaust gas 26 and eventually releases the exhaust gas to the ambient, typically on a side or aft of the vehicle 10. The turbocharger 24 also uses the exhaust gas 26 flow to pressurize the intake airflow 16. The turbocharger 24 may be configured as a variable-geometry turbocharger (VGT). A VGT is typically designed to allow the effective aspect ratio (A:R) of the turbocharger to be altered in line with engine speed, and thus facilitate increased engine operating efficiency.

The variable geometry of such a VGT is frequently achieved via a variable position vane mechanism (not shown). VGTs tend to be more common on compression-ignition or diesel engines, as compared to spark-ignition or gasoline engines, because lower exhaust temperatures of a diesel engine provides a less extreme environment for the movable components of the VGT. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

Figure 2:
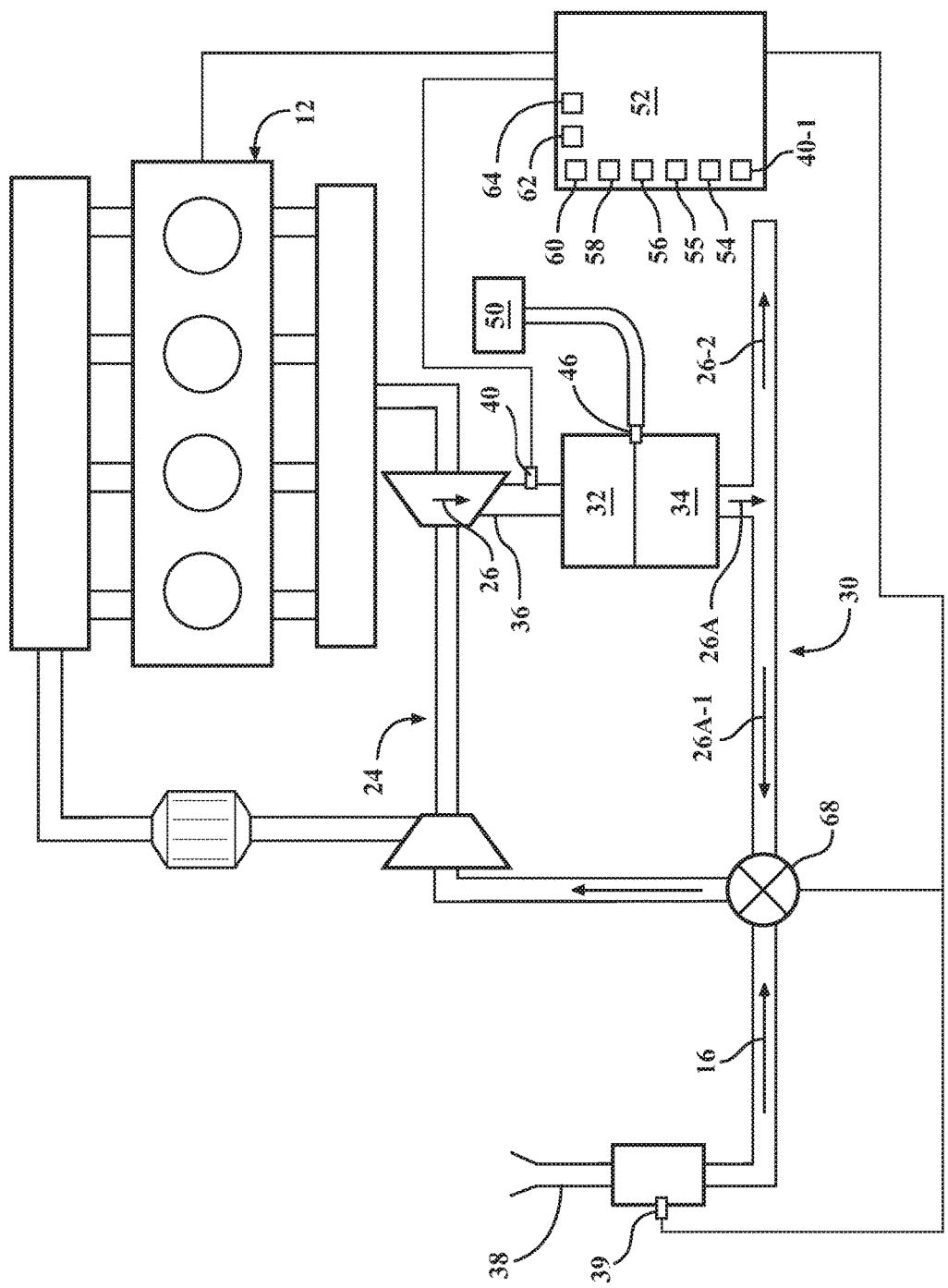
FIG. 2 is a schematic illustration of the internal combustion engine connected to the exhaust system with the AT shown in FIG. 1.

The vehicle 10 also includes an engine exhaust after-treatment (AT) system 30. The AT system 30 includes a number of exhaust after-treatment devices configured to methodically remove largely carbonaceous particulate byproducts and emission constituents of engine combustion from the exhaust gas 26. As shown in FIGS. 1 and 2, the AT system 30 operates as part of the exhaust system 28. The AT system 30 includes at least one AT device, such as a first AT device 32 arranged downstream of the turbocharger 24 and a second AT device 34 arranged downstream of the first AT device. The first AT device 32 may be close-coupled to the turbocharger 24 and arranged inside an engine compartment 11 of the vehicle 10 for close proximity to the engine 12. Such close-coupling of the first AT device 32 to the engine 12 may provide a compact packaging arrangement that minimizes time for activation, i.e., light-off, of the AT system 30 in after-treatment of the exhaust gas 26 following a cold-start of the engine 12. The AT system may also include additional AT devices (not shown) positioned in the exhaust gas flow downstream of the first and second AT devices 32, 34.

As shown, the first AT device 32 may be a diesel oxidation catalyst (DOC), while the second AT device 34 may be a selective catalytic reduction (SCR) catalyst. The primary function of the DOC is reduction of carbon monoxides (CO) and non-methane hydrocarbons (NMHC). When present, the DOC is additionally configured to generate nitrogen dioxide ($NO_2$), which may be used by the SCRF arranged remotely downstream of the DOC and described in greater detail below. The DOC typically contains a catalyst substance made up of precious metals, such as platinum and/or palladium, which function therein to accomplish the above-noted objectives. Generally, with respect to generation of $NO_2$, the DOC becomes activated and reaches operating efficiency at elevated temperatures. Therefore, as shown in FIGS. 1 and 2, the DOC may be close-coupled to the turbocharger 24 in order to reduce loss of thermal energy from the exhaust gas 26 flow prior to the gas reaching the DOC.

The primary function of the SCR is to convert nitrogen oxides ($NO_X$) into diatomic nitrogen ($N_2$) and water ($H_2O$), for example, with the aid of the $NO_2$ generated by the first AT device 32 configured as the DOC. The SCR may be configured as a 1-way filter, which filters particulate matter or soot, or a 2-way filter, which includes a catalyzed wash-coat, and carries two functions—filters particulate matter and reduces $NO_X$. For effective removal of $NO_X$, the SCR conversion process additionally requires a predetermined amount of ammonia ($NH_3$) to be present in the fuel-rich exhaust gas 26. The SCR may be close-coupled to the DOC and be further encased in a common housing therewith to reduce a loss of thermal energy as the exhaust gas 26 flows from the DOC to the SCR.

The AT system 30 also includes an exhaust passage 36 configured to carry the flow of exhaust gas 26 from the turbocharger 24 to the first AT device 32. The intake airflow 16 is supplied to the engine 12 via an intake passage 38 for mixing with fuel, to generate combustion, thereby operate the engine, and generate a flow of the exhaust gas 26. An airflow sensor 39 may be arranged in the intake passage 38 and configured to detect an amount of the airflow 16 supplied to the engine 12 during its operation. The AT system 30 additionally includes a sensor 40 configured to detect an actual first concentration 40-1 of a pollutant in the exhaust gas upstream of the second AT device 34 and generate a signal indicative of the detected first concentration of the pollutant. An exhaust gas passage 42 is configured to receive treated exhaust gas 26A and pass the treated exhaust gas through the rest of the exhaust system 28 and the remainder of the AT system 30.

The AT system 30 also includes an exhaust gas recirculation (EGR) passage 44. The EGR passage 44 is configured to recirculate a portion 26A-1 of the treated exhaust gas 26A from the exhaust gas passage 42 to the intake passage 38, while the remainder 26-2 of the treated exhaust gas is directed through the rest of the exhaust system 28. In the embodiment of the AT system 30 wherein the second AT device 34 is the above-described SCR catalyst, the subject pollutant may be $NO_X$. In such an embodiment, the sensor 40 may be a $NO_X$ sensor, which is correspondingly configured to detect an actual first $NO_X$ concentration (actual first concentration 40-1) in the exhaust gas 26 upstream of the SCR catalyst. Also, as part of the AT system 30, an injector 46 may be configured to inject a reductant 48 into the exhaust gas 26 upstream of the SCR catalyst. In diesel engine applications, the reductant 48 typically contains ammonia ($NH_3$), such as an aqueous solution of urea, a.k.a., diesel-exhaust-fluid (DEF). As shown in FIG. 1, the injector 46 may receive the reductant 48 from a refillable reservoir 50. Accordingly, in such an embodiment, the SCR embodiment of the second AT device 34 is configured to treat the exhaust gas 26 using the injected reductant 48.

The vehicle 12 additionally includes an electronic controller 52 configured to regulate the AT system 30, and, as such, the controller may be part of the AT system. The controller 52 may be a stand-alone unit, or be part of an electronic control unit (ECU) that regulates the operation of engine 12. The controller 52 is arranged on the vehicle 10 and includes a processor and a readily accessible non-transitory memory. Instructions for controlling operation of the AT system 30 are programmed or recorded in the memory of the controller 52 and the processor is configured to execute the instructions from the memory during operation of the vehicle 10. The controller 52 is generally programmed to regulate the injector 46 for introducing the reductant 48 upstream of the SCR second AT device 32, i.e., between the first and second AT devices 32, 34, during operation of the engine 12. The controller 52 is also in communication with the sensor 40 for regulating the injector 46 in response to the detected concentration of the particular pollutant, as well as for regulation of other engine systems. Accordingly, the sensor 40 is configured to communicate the detected actual first concentration 40-1 of the subject pollutant, such as of $NO_X$, and communicate a signal indicative of the detected actual first concentration of the pollutant to the controller 52.

The controller 52 is also configured to determine or calculate a theoretical efficiency 54 of the second AT device 34, after recirculating the portion of the treated exhaust gas 26A, using the detected actual first concentration 40-1 of the pollutant. Theoretical efficiency 54, represented by the Greek letter "η", of the second AT device 34, e.g., SCR, can be calculated according to the general mathematical relationship 55:

$$\eta_{(Calc)} = 1 - (\text{NO}_{X(Downstream\ Calc)} / \text{NO}_{X(Upstream)})$$

In the above relationship 55, the factors $\text{NO}_{X(Downstream\ Calc)}$ and $\text{NO}_{X(Upstream)}$ may be represented by appropriate values of the $NO_X$ concentration downstream and upstream of the second AT device 34, respectively. Such downstream and upstream concentrations of $NO_X$ may be actually detected or sensed, or, alternatively, determined via appropriate methods or mathematical models.

The controller 52 is additionally configured to maintain operation of the AT system 30 when the determined theoretical efficiency 54 of the second AT device 34 is at or above a predetermined value 56. Furthermore, the controller 52 is configured to activate a sensory signal 58 indicative of the second AT device 34 having malfunctioned, if the determined theoretical efficiency of the AT device has dropped below the predetermined value 56. The sensory signal 58 may include activating a malfunction indicator lamp (MIL) and/or setting an electronic trouble code embedded in the memory of the controller 52 and made available for subsequent retrieval by an authorized entity, such as a technician at a vehicle maintenance and repair facility. The controller 52 may also be configured to activate a limited operating range, emergency, e.g., reduced power, limp-home mode for the engine 12 when the determined theoretical efficiency 54 of the second AT device 34 is below the predetermined value 56.

The airflow sensor 39 detects the amount of the airflow 16 supplied to the engine 12 throughout operation of the engine and, specifically, when the portion 26A-1 of the treated exhaust gas 26 is recirculated. The airflow sensor 39 is in communication with the controller 52 and, therefore, communicates to the controller a signal indicative of the detected amount of airflow 16. The controller 52 may be programmed with, as determined from a mathematical model, or configured to determine a theoretical first concentration 60 (e.g., theoretical first $NO_X$ concentration). The controller 52 may be further configured to determine a theoretical second concentration 62 of the pollutant, such as of $NO_X$, in the exhaust passage 42 downstream of the second AT device 34 using the detected actual first concentration 40-1 (e.g., actual first $NO_X$ concentration), the determined theoretical first concentration 60 (e.g., theoretical first $NO_X$ concentration) and the detected amount of airflow 16. Moreover, the above noted determination of the theoretical efficiency of the second AT device 34 may be accomplished by the controller 52 using the determined theoretical second concentration 62 of the pollutant (e.g., theoretical second $NO_X$ concentration) in the mathematical relationship 55.

Using the above factors, the controller 52 may be additionally configured to use a mathematical relationship 64 to determine a theoretical first concentration 62 of the pollutant, such as of $NO_X$, in the exhaust passage between the engine 12 and the second AT device 34, such as the SCR, after the portion 26A-1 of the treated exhaust gas 26A was recirculated by the EGR passage 44.

The mathematical relationship 64 relates the above factors as follows:

$$\text{NO}_{X(Downstream\ Calc)} = \text{NO}_{X(Upstream\ Sns)} - [\text{NO}_{X(Upstream\ Model)} - \text{NO}_{X(Upstream\ Sns)} * (\text{Air\_HFM} + \text{LR\_Flow}) / \text{LR\_Flow}]$$

In the above relationship 64, as well as wherever applicable in the relationship 55, the factor $\text{NO}_{X(Downstream\ Calc)}$ represents the theoretical second concentration 62 of the pollutant downstream of the second AT device 34; the factor $\text{NO}_{X(Upstream\ Sns)}$ represents the detected or sensed actual first concentration 40-1 of the pollutant upstream of the second AT device 34; the factor $\text{NO}_{X(Upstream\ Model)}$ represents the theoretical first concentration 60 of the pollutant which may be obtained using a mathematical model and programmed into the controller 52; Air_HFM represents the amount of airflow 16 detected by the airflow sensor 39; and the factor LR_Flow represents the amount of the exhaust gas contained in the treated portion 26A-1 recirculated by the EGR passage 44. The factor LR_Flow may be determined either via a mathematical model or detected by an exhaust mass flow sensor 66. Furthermore, the factor LR_Flow may correspondingly be either programmed into or communicated to the controller 52, i.e., be generally identified by the controller, for use in the mathematical relationship 64 and determination of the theoretical value of second concentration 62. The theoretical value of second concentration 62 may then be used as the factor $\text{NO}_{X(Downstream\ Calc)}$ in the relationship 55 to determine the theoretical efficiency 54 of the second AT device 34.

The AT system 30 may also include an exhaust pressure modulation (EPM) valve 68 configured to regulate the EGR passage 44 and in electronic communication with the controller 52. In such an embodiment, the EPM valve 68 regulates the EGR passage 44 to recirculate the portion 26A-1 of the treated exhaust gas 26A by redirecting the exhaust gas 26 from the exhaust gas passage 42 to the VGT. To promote durability of the turbocharger 24, the recirculated the portion 26A-1 of the treated exhaust gas 26 flow may be accomplished as a low pressure exhaust gas recirculation (LPEGR).

Overall, as described, the AT system 30 uses the controller 52 to continuously monitor operation of the engine 12 and the AT system to alert a user of the vehicle 10 regarding required maintenance of the AT system 30 based on determined theoretical efficiency 54 of the second AT device 34. Additionally, the AT system 30 may be employed to limit operation of the engine 12 to a limp-home mode in the event the determined second AT device efficiency 54 has decreased below the predetermined value 56. Furthermore, the AT system 30 is configured to employ a single sensor, i.e., the sensor 40, for detecting the actual concentration of a pollutant, such as $NO_X$, upstream of the second AT device 34, such as SCR, without the necessity to employ a second sensor for detecting concentration of the subject pollutant downstream of the second AT device 34.

Figure 3:
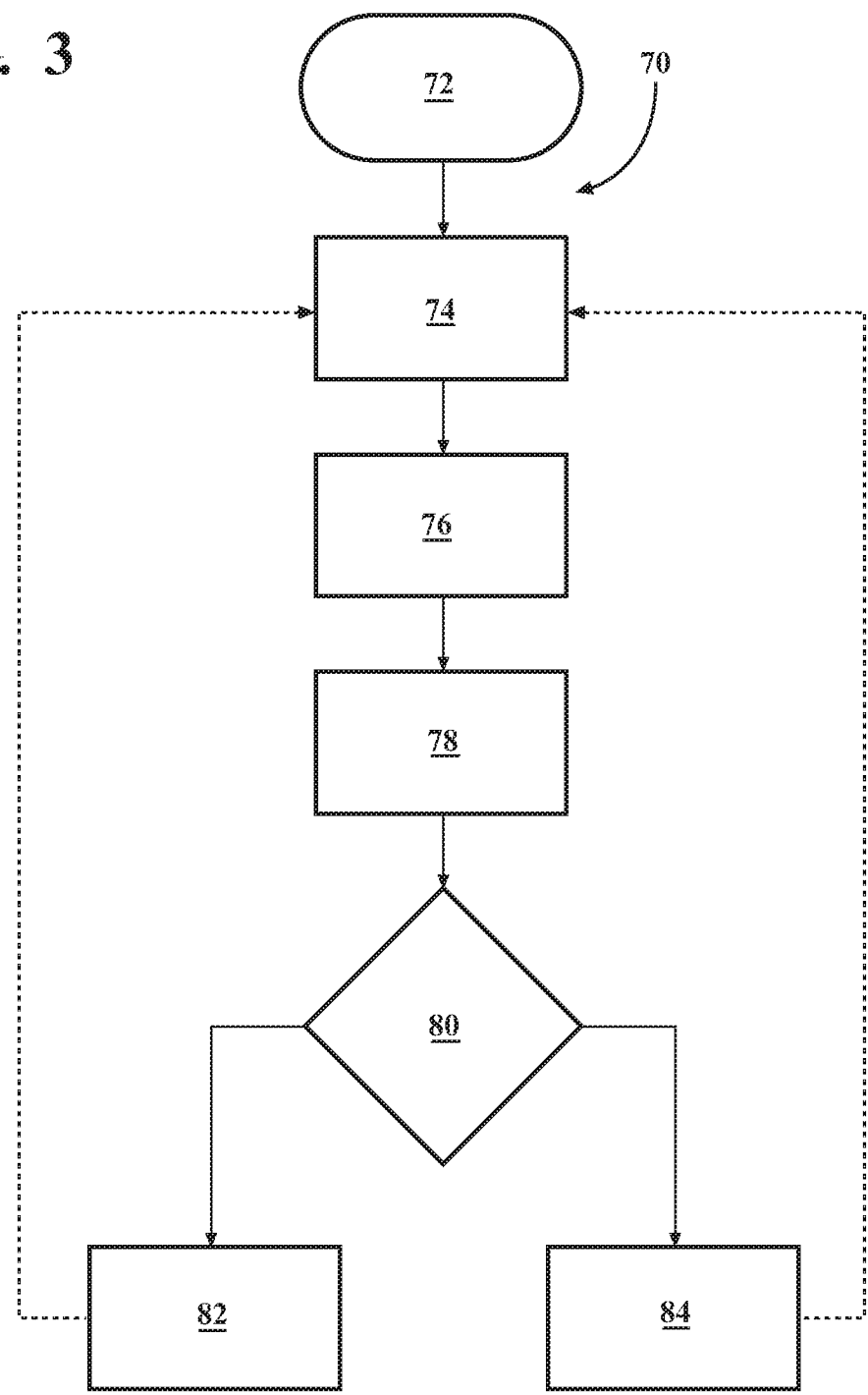
FIG. 3 is a flow diagram of a method of operating the AT system shown in FIGS. 1 and 2.

FIG. 3 depicts a method 70 of operating the engine 12 employing the after-treatment (AT) system 30 having, among other elements, the second after-treatment (AT) device 34, for example configured as the selective catalytic reduction (SCR) catalyst, as described above with respect to FIGS. 1 and 2. Although the method 70 is primarily described herein with reference to the compression-ignition engine using the SCR catalyst, in general, the same method may be applied to a spark-ignition engine using different AT devices, as discussed above. The method 70 initiates in frame 72 with the intake airflow 16 being supplied to the engine 12 via the intake passage 38 to thereby operate the engine and generate the exhaust gas 26. Throughout the method, and starting with frame 72, the method may include detecting, via the airflow sensor 39, an amount of the airflow 16 supplied to the engine 12.

Following frame 72, the method proceeds to frame 74, where the method includes detecting the actual first concentration 40-1 of a pollutant, such as the nitrogen oxide ($NO_X$), via the sensor 40, e.g., $NO_X$ sensor, in the exhaust gas 26 upstream of the second AT device 34. In frame 74, the method also includes the sensor 40 communicating a signal indicative of the detected actual first concentration 40-1 of the pollutant to the controller 52. After frame 74, the method advances to frame 76. In frame 76, the method includes treating, via the second AT device 34, the exhaust gas 26 to reduce concentration of the pollutant therein. In frame 74, the method also includes directing the treated exhaust gas 26A to the exhaust gas passage 42. In the embodiment where the second AT device 34 is configured as the SCR catalyst, the pollutant is $NO_X$, and the sensor 40 is a $NO_X$ sensor, as described above with respect to FIGS. 1 and 2, in frame 76, the method may additionally include injecting the reductant 48 into the exhaust gas 26 upstream of the SCR catalyst. In frame 76 the step of treating the exhaust gas 26 may include the SCR catalyst using the injected reductant 48.

Following frame 76 the method proceeds to frame 78, where the method includes recirculating, via the EGR passage 44, the portion 26A-1 of the treated exhaust gas 26A from the exhaust gas passage 42 to the intake passage 38. As described above with respect to FIGS. 1 and 2, in the embodiment of the AT system 30 additionally including the EPM valve 68 together with the engine 12 employing the turbocharger 24, such as the VGT, the step of recirculating the portion 26A-1 of the treated exhaust gas 26A may include redirecting the treated exhaust gas 26A from the exhaust gas passage 42 to the turbocharger 24. In frame 78, the method may also include detecting, via the airflow sensor 39, an amount of the airflow 16 supplied to the engine 12 when the portion 26A-1 of the treated exhaust gas 26A is recirculated. Additionally, in frame 78 of such an embodiment, the method may include communicating to the controller 52 a signal indicative of the detected amount of airflow 16, and further include determining, via the controller 52 using the mathematical relationship 64, the theoretical first concentration 60 of the pollutant, such as $NO_X$, in the exhaust gas 26 between the engine 12 and the second AT device 34, such as the SCR. Also, in such an embodiment, the method may include determining, via the controller 52, the theoretical second concentration 62 of the pollutant in the exhaust passage 42 downstream of the second AT device 34 using the detected actual first concentration 40-1 of the pollutant the determined theoretical first concentration 60 of the subject pollutant, and the detected amount of airflow 16.

After frame 78, the method advances to frame 80. In frame 80 the method includes determining, such as calculating, via the controller 52, the theoretical efficiency 54 of the second AT device 34 using the detected first concentration 40-1 of the pollutant. Furthermore, the step of determining the theoretical efficiency 54 of the second AT device 34 in frame 78 may be accomplished via the controller 52 using the determined theoretical second concentration 62 of the pollutant in the mathematical relationship 64. Following frame 80, when the determined theoretical efficiency 54 of the second AT device 34 is at or above the predetermined value 56, the method moves on to frame 82. In frame 82 the method includes maintaining, via the controller 52, operation of the AT system 30 and regular, uninhibited operation of the engine 12. On the other hand, when the determined theoretical efficiency 54 of the second AT device 30 is below the predetermined value 56, the method moves on to frame 84. In frame 84 the method includes activating, via the controller 52, the sensory signal 58 indicative of the second AT device 34 having malfunctioned.

Following either frame 82 or 84, the method may loop back to frame 74 for detecting the actual first concentration 40-1 of the subject pollutant. Accordingly, the controller 52 may be programmed to continuously monitor operation of the engine 12 and the AT system 30 based on determination of the theoretical efficiency 54 of the second AT device 34. Additionally, the method 70 may be used to alert a user of the vehicle 10 regarding required maintenance of the AT system 30 in response to the determined theoretical efficiency 54 of the second AT device 34 having decreased below the predetermined value 56 and limit operation of the engine 12 to a prescribed limp-home mode. Critically, the method 70 permits the use of a single sensor, i.e., the sensor 40, for detecting the actual concentration of a pollutant upstream of the second AT device 34 without the necessity to employ a second sensor for detecting concentration of the subject pollutant downstream of the second AT device.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of operating an internal combustion engine employing an after-treatment (AT) system with a selective catalytic reduction (SCR) catalyst configured to treat an exhaust gas generated by the engine, comprising:

supplying an intake airflow to the engine via an intake passage to thereby operate the engine and generate the exhaust gas;

detecting, via a $NO_X$ sensor, an actual first concentration of nitrogen oxide ($NO_X$) in the exhaust gas upstream of the SCR catalyst and communicating a signal indicative of the detected actual first concentration of the $NO_X$ to a controller configured to regulate the AT system;

treating, via the SCR catalyst, the exhaust gas to reduce concentration of the $NO_X$ therein and directing the treated exhaust gas to an exhaust gas passage;

recirculating, via an exhaust gas recirculation (EGR) passage, a portion of the treated exhaust gas from the exhaust gas passage to the intake passage;

detecting, via an intake airflow sensor, an amount of the intake airflow supplied to the engine when the portion of the treated exhaust gas is recirculated, and communicating to the controller a signal indicative of the detected amount of intake airflow;

determining, via the controller, a theoretical first $NO_X$ concentration in the exhaust gas between the engine and the SCR catalyst after recirculating the portion of the treated exhaust gas; and determining, via the controller using a mathematical relationship, a theoretical second $NO_X$ concentration in the exhaust passage downstream of the SCR catalyst using the detected actual first $NO_X$ concentration, the determined theoretical first $NO_X$ concentration, and the detected amount of intake airflow;

determining via the controller, after recirculating the portion of the treated exhaust gas, a theoretical efficiency of the SCR catalyst using the detected actual first concentration of the $NO_X$ and the determined theoretical second $NO_X$ concentration;

maintaining, via the controller, operation of the AT system when the determined theoretical efficiency of the SCR catalyst is at or above a predetermined value; and activating, via the controller, a sensory signal indicative of the SCR catalyst having malfunctioned when the determined theoretical efficiency of the SCR catalyst is below the predetermined value.

2. The method of claim 1, further comprising injecting a reductant into the exhaust gas upstream of the SCR catalyst, wherein treating the exhaust gas includes the SCR catalyst using the injected reductant.

3. The method of claim 1, further comprising determining an amount of the exhaust gas contained in the recirculated portion of the treated exhaust gas and using the determined amount of the exhaust gas in the mathematical relationship to determine the theoretical first $NO_X$ concentration.

4. The method of claim 1, wherein the AT system additionally includes:

an exhaust pressure modulation (EPM) valve configured to regulate the EGR passage and in electronic communication with the controller, and a variable-geometry turbocharger (VGT) configured to be driven by the exhaust gas and to pressurize the intake airflow; and wherein recirculating the portion of the treated exhaust gas includes redirecting the treated exhaust gas from the exhaust gas passage to the VGT.

5. The method of claim 1, wherein activating the sensory signal includes at least one of activating a malfunction indicator lamp (MIL) and setting an electronic trouble code embedded in the memory of the controller.

6. The method of claim 1, further comprising:

activating, via the controller, a limp-home mode for operating the engine when the determined theoretical efficiency of the SCR catalyst is below the predetermined value.

7. A method of operating a compression-ignition internal combustion engine employing an after-treatment (AT) system with an SCR catalyst configured to treat an exhaust gas generated by the engine, comprising:

supplying an intake airflow to the engine via an intake passage to thereby operate the engine and generate the exhaust gas;

detecting, via a nitrogen oxide ($NO_X$) sensor, an actual first $NO_X$ concentration in the exhaust gas upstream of the SCR catalyst and communicating a signal indicative of the detected actual first $NO_X$ concentration to a controller configured to regulate the AT system;

injecting a reductant into the exhaust gas upstream of the SCR catalyst;

treating, via the SCR catalyst using the injected reductant, the exhaust gas and directing the treated exhaust gas to an exhaust gas passage;

recirculating, via an exhaust gas recirculation (EGR) passage, a portion of the treated exhaust gas from the exhaust gas passage to the intake passage;

detecting, via an intake airflow sensor, an amount of the intake airflow supplied to the engine when the portion of the treated exhaust gas is recirculated, and communicating to the controller a signal indicative of the detected amount of intake airflow;

determining, via the controller, a theoretical first $NO_X$ concentration in the exhaust gas between the engine and the SCR catalyst after recirculating the portion of the treated exhaust gas; and determining, via the controller using a mathematical relationship, a theoretical second $NO_X$ concentration in the exhaust passage downstream of the SCR catalyst using the detected actual first $NO_X$ concentration, the determined theoretical first $NO_X$ concentration, and the detected amount of intake airflow;

determining via the controller, after recirculating the portion of the treated exhaust gas, a theoretical efficiency of the SCR catalyst using the detected actual first $NO_X$ concentration and the determined theoretical second $NO_X$ concentration;

maintaining, via the controller, operation of the AT system when the determined theoretical efficiency of the SCR catalyst is at or above a predetermined value; and activating, via the controller, a sensory signal indicative of the SCR catalyst having malfunctioned when the determined theoretical efficiency of the SCR catalyst is below the predetermined value.

8. The method of claim 7, further comprising determining an amount of the exhaust gas contained in the recirculated portion of the treated exhaust gas and using the determined amount of the exhaust gas in the mathematical relationship to determine the theoretical first $NO_X$ concentration.

9. The method of claim 7, wherein the AT system additionally includes:
- an exhaust pressure modulation (EPM) valve configured to regulate the EGR passage and in electronic communication with the controller, and
- a variable-geometry turbocharger (VGT) configured to be driven by the exhaust gas and to pressurize the intake airflow; and
- wherein recirculating the portion of the treated exhaust gas includes redirecting the treated exhaust gas from the exhaust gas passage to the VGT.

10. The method of claim 7, wherein activating the sensory signal includes at least one of activating a malfunction indicator lamp (MIL) and setting an electronic trouble code embedded in the memory of the controller.

11. The method of claim 7, further comprising: activating, via the controller, a limp-home mode for operating the engine when the determined theoretical efficiency of the SCR catalyst is below the predetermined value.

12. An after-treatment (AT) system for an exhaust gas generated by an internal combustion engine having an intake passage configured to supply an intake airflow to the engine, the AT system comprising:
- a selective catalytic reduction (SCR) catalyst configured to treat the exhaust gas;
- a $NO_X$ sensor configured to detect an actual first concentration of nitrogen oxide ($NO_X$) in the exhaust gas upstream of the SCR catalyst and generate a signal indicative of the detected first concentration of the $NO_X$;
- an exhaust gas passage configured to receive the treated exhaust gas;
- an exhaust gas recirculation (EGR) passage configured to recirculate a portion of the treated exhaust gas from the exhaust gas passage to the intake passage;
- an intake airflow sensor configured to detect an amount of the intake airflow supplied to the engine; and
- an electronic controller configured to regulate the AT system and:
  - receive the signal indicative of the detected actual first $NO_X$ concentration;
  - receive a signal from the intake airflow sensor indicative of the detected amount of intake airflow when the portion of the treated exhaust gas is recirculated;
  - determine a theoretical first $NO_X$ concentration in the exhaust passage between the engine and the SCR catalyst after the portion of the exhaust gas was recirculated by the EGR passage;
  - use a mathematical relationship to determine a theoretical second $NO_X$ concentration in the exhaust passage downstream of the SCR catalyst using the detected actual first $NO_X$ concentration, the determined theoretical first $NO_X$ concentration, and the detected amount of intake airflow;
  - determine a theoretical efficiency of the SCR catalyst, after recirculating the portion of the treated exhaust gas, using the detected actual first concentration of the $NO_X$ and the determined theoretical second $NO_X$ concentration;
  - maintain operation of the AT system when the determined theoretical efficiency of the SCR catalyst is at or above a predetermined value; and
  - activate a sensory signal indicative of the SCR catalyst having malfunctioned if the determined theoretical efficiency of the SCR catalyst has dropped below the predetermined value.

13. The AT system of claim 12, further comprising an injector configured to inject a reductant into the exhaust gas upstream of the SCR catalyst, wherein the SCR catalyst is configured to treat the exhaust gas using the injected reductant and the controller is configured to regulate the injector.

14. The AT system of claim 12, wherein the controller is further configured to identify an amount of the exhaust gas contained in the recirculated portion of the treated exhaust gas and use the identify amount of the exhaust gas in the mathematical relationship to determine the theoretical first $NO_X$ concentration.

15. The AT system of claim 12, wherein the AT system additionally includes:
- an exhaust pressure modulation (EPM) valve configured to regulate the EGR passage and in electronic communication with the controller, and
- a variable-geometry turbocharger (VGT) configured to be driven by the exhaust gas and to pressurize the intake airflow; and
- wherein the EGR passage is further configured to recirculate the portion of the treated exhaust gas by redirecting the treated exhaust gas from the exhaust gas passage to the VGT.

16. The AT system of claim 12, wherein activating the sensory signal includes at least one of activating a malfunction indicator lamp (MIL) and setting an electronic trouble code embedded in the memory of the controller.

17. The AT system of claim 12, wherein the controller is additionally configured to activate a limp-home mode for operating the engine when the determined theoretical efficiency of the SCR catalyst is below the predetermined value.

* * * * *